United States Patent [19]

Ibar

[11] Patent Number: 4,919,870
[45] Date of Patent: Apr. 24, 1990

[54] PROCESS OF AND APPARATUS FOR TREATING A SHAPED PRODUCT

[76] Inventor: Jean-Pierre Ibar, Avenue de la Division-Leclerc, F-91100 Ballainvilliers, France

[21] Appl. No.: 246,396

[22] PCT Filed: Dec. 15, 1987

[86] PCT No.: PCT/FR87/00501
§ 371 Date: Oct. 15, 1988
§ 102(e) Date: Oct. 15, 1988

[87] PCT Pub. No.: WO88/04606
PCT Pub. Date: Jun. 30, 1988

[30] Foreign Application Priority Data

Dec. 15, 1986 [FR] France .................................. 86 17472

[51] Int. Cl.$^5$ ............................................. B29C 71/00
[52] U.S. Cl. ..................... 264/70; 264/209.2; 264/209.3; 264/210.2; 264/280; 264/340; 425/343; 425/363; 425/365; 425/392; 425/394; 425/406; 425/409
[58] Field of Search ..................... 264/70, 209.2, 209.3, 264/210.2, 232, 280, 294, 340; 425/340, 343, 363, 365, 392, 394, 406, 409, 445, 446

[56] References Cited

U.S. PATENT DOCUMENTS

| | | | |
|---|---|---|---|
| 3,205,289 | 9/1965 | Carpenter | 264/280 |
| 3,275,730 | 9/1966 | Feild | 264/280 X |
| 3,474,652 | 10/1969 | Marcovitch | 72/190 |
| 3,643,485 | 2/1972 | Marcovitch | 72/96 |
| 3,883,631 | 5/1975 | Murray | 264/210.2 |
| 4,141,953 | 2/1979 | Kepes et al. | 264/340 |
| 4,288,398 | 9/1981 | Lemelson | 264/70 X |
| 4,469,649 | 9/1984 | Ibar | 264/70 X |
| 4,711,624 | 12/1987 | Watson | 425/384 |

*Primary Examiner*—Jeffery Thurlow
*Assistant Examiner*—Leo B. Tentoni
*Attorney, Agent, or Firm*—Seidel, Gonda, Lavorgna & Monaco

[57] ABSTRACT

A cylindrical product, such as a hollow tube or solid rod, is subjected to a series of manufacturing processes. The cylindrical product is moved longitudinally through a sequence of stages, each stage having an opening through which the cylindrical product passes. The plurality of stages are arranged in a series to perform a specific rheological process. Each stage includes means for applying a preselected temperature, pressure, and vibration to the cylindrical product.

15 Claims, 6 Drawing Sheets

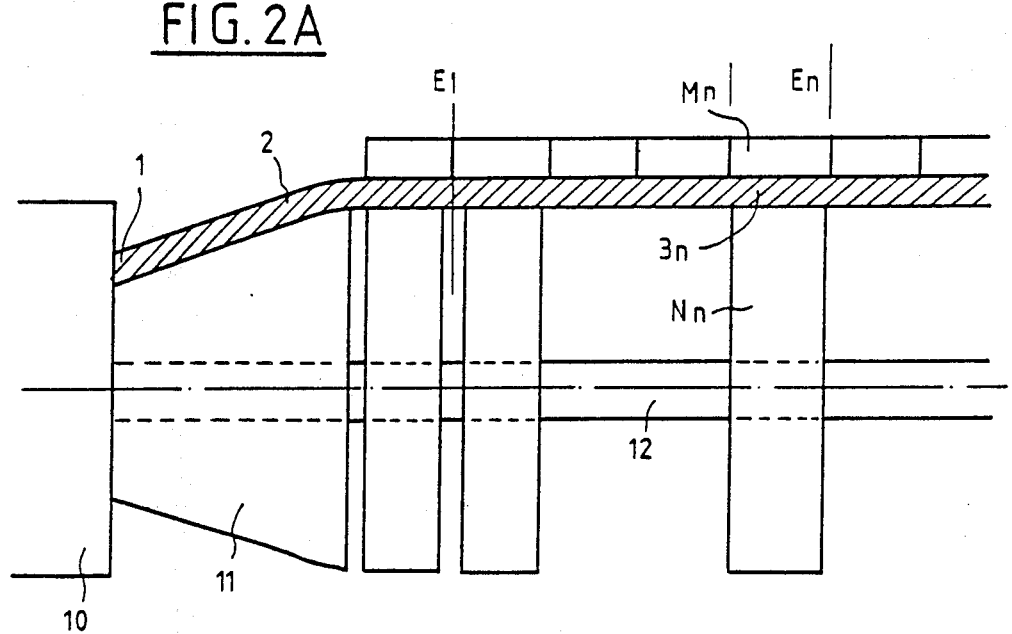
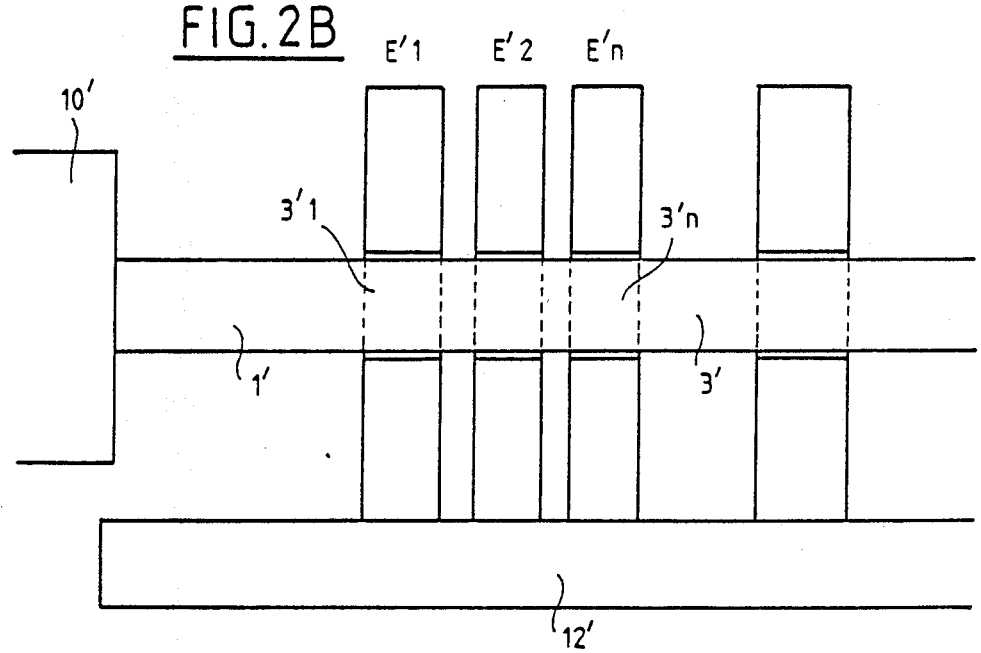

PROCESS OF AND APPARATUS FOR TREATING A SHAPED PRODUCT

FIELD OF THE INVENTION

The present invention relates to a process and an installation for the extrusion of a product in the shape of a film, panel, tube, rod or filament.

BACKGROUND OF THE INVENTION

The object of the present invention is to provide means which permit continuously extruding and treating a product so as to subject each length of the product travelling through the installation to conditions of pressure, temperature and vibration frequency which modify the morphological structure and, hence, the physico-chemical properties of the product, by varying these conditions of pressure, temperature and frequency in accordance with a predetermined program so as to perform a continuous rheological treatment of the product.

It is to be noted that the morphological structure of the product is in particular defined by the degree of crystallinity, the texture, the type of crystals, the shape of the crystals, the size of the crystals, the elementary shape of the crystals, the interlamellar structure, the orientation determined by the nature of the bonds and the shape of the macromolecules and, in particular in the case of amorphous plastics, the "free volume", the total free volume and the structure of the free volume, these two factors determining the extent of internal strains existing in the product in the glassy state, and probably the ductility of the product.

The physico-chemical properties of the product are, in particular, its mechanical properties, that is to say its impact strength, ductility, modulus of elasticity, flow behavior and fatigue resistance.

The electrical properties are especially the breakdown voltage, the conductivity, the charge dissipation and the insulation resistance.

The thermal properties define are use temperature, the physical ageing resistance (if the material is heated) or its resistance to corrosion, oxidation and corrosive agents.

It is already known to modify the physico-chemical properties of a product by subjecting it to pressure, temperature and frequency variations in accordance with a program drawn up beforehand, which program depends on the variations to be achieved.

However, such operations are currently only carried out on samples of products and are not carried out continuously on a product in the shape of a tube, film or rod passing through an installation.

The object of the present invention is to provide means which make it possible to carry out such a treatment continuously.

SUMMARY OF THE INVENTION

To this effect, the invention relates to a process for the extrusion of a product of the above type, characterized in that the product is caused to pass through treatment zones in which conditions of pressure, temperature and frequency set up in accordance with a defined program prevail, so as to carry out a continuous rheological treatment on the product, so as to apply these conditions of pressure, temperature and frequency to the length present in the particular zone, the process being carried out in such a manner as to cause each length of the product to travel through all the zones.

The invention also relates to an installation for carrying out this process, which installation is characterized in that it comprises a set of successive stages through which the product to be treated passes and that each length of product is subjected to the particular conditions of pressure, temperature and frequency defined in that particular stage by the rheological treatment program, each stage through which the product passes being composed of an external part and/or an internal part through which the product passes.

According to another characteristic of the invention, the external part consists of a peripheral fixed ring constituting a guide surface and touching the external surface of the product, the temperature corresponding to this stage, and the internal part is composed of rotary equipment comprising rollers revolving against the internal surface of the length of tube undergoing treatment, these rollers being subjected to the pressure exerted by a pressure chamber so as to exert, on the internal surface of the length of product, the pressure and frequency corresponding to this stage, the number of rollers and the speed of rotation of these rollers against the internal surface of the length of product being chosen so as to give the desired frequency, while the pressure exerted on the rollers by the pressure chamber is the pressure of this stage of the process.

According to another characteristic of the invention, the rotary equipment of the internal part consists of epicycloidal gearwheels driven from an axle which is common to at least some of the stages.

According to another characteristic of the invention, each stage consists of rotary equipment through the center of which passes the product to be treated, this rotary equipment consisting of a set of internal rollers seated in a peripheral pressure chamber, the assembly being driven rotationally from an external drive axle, the number of rollers and the speed of rotation of these rollers at the surface of the length of product to be treated corresponding to the frequency of the stage, the pressure prevailing in the pressure chamber and exerted on the product via the rollers being the pressure of this stage and the rollers being held at the temperature of the stage.

According to another characteristic of the invention the internal part and/or the external part of each stage comprises a sleeve which cooperates directly with the external surface and/or the internal surface of the product to be treated, this sleeve being equipped with at least one track which is at least partially equipped with an orifice on the side facing the product to be treated, and the sleeve containing rolling devices which partially project through the orifice in the track so as to rest against the surface of the product to be treated.

Where appropriate, the installation comprises a sleeve which interacts with the external surface or a sleeve which interacts with the internal surface or two sleeves which respectively correspond to the external surface and the internal surface of the product to be treated.

Though the installation is preferably designed to treat tubes or rods, that is to say hollow products or flat products, and in particular very long products comparable to products which travel continuously through the installation, the invention is applicable, under the same conditions, to the treatment of products of relatively short length. Similarly, the installation permits the treatment of products in film or panel shape; in that case, it suffices simply to regard the outer or inner sleeve as a cylinder of circular section and of infinitely large radius.

Outside or inside the sleeve, depending on whether the sleeve belongs to the external part or the internal part, the installation can comprise means for applying pressure or means for applying a temperature control (cooling or heating) fluid, so as to define precisely the pressure, temperature and frequency conditions which correspond to the rheological treatment program.

The track has an outline, at least in its active parts, which corresponds to the treatment to be carried out on the product.

According to an interesting characteristic, the track is of meandering shape, comprising segments with return portions, and at least some of the segments are provided with an orifice on the side of the product to be treated.

This meandering track can occupy the entire surface of the sleeve.

According to a particular characteristic, the open segments are longitudinal sections relative to the axis of the sleeve.

In a particularly simple embodiment, the longitudinal segments run along the generatrices of the cylinder defining the sleeve, and every other segment is open so that the rolling devices all travel in the same direction.

According to a particularly valuable characteristic, the rolling devices are balls.

Though in general the balls can move by simple contact with the product to be treated, it can in certain cases be of value if the balls, or more generally the rolling devices, are driven from without, so as to exert an acceleration force or braking force on the product.

According to a particularly simple solution, the rolling devices are driven by a fluid and for this purpose the sleeve comprises a box for the distribution of propulsion fluid, communicating with the track so as to inject therein a propulsion fluid.

According to another characteristic of the invention, the balls are composed of active balls of large diameter and spacer balls of small diameter, the balls of large diameter projecting from the open segments of the meandering track while the balls of small diameter keep the balls of large diameter separated.

According to another characteristic of the invention, the installation is of modular structure and each stage consists of a block equipped with at least one sleeve.

Finally, in order to transmit the pressure to be exerted against the internal surface or the external surface of the product to be treated, it is of value that the diameter of the sleeve can be varied so that the sleeve can transmit the forces intended for the product to be treated.

BRIEF DESCRIPTION OF THE DRAWING

The present invention will be described in more detail with the aid of the attached drawings in which.

DETAILED DESCRIPTION OF THE INVENTION

Figure 1A:
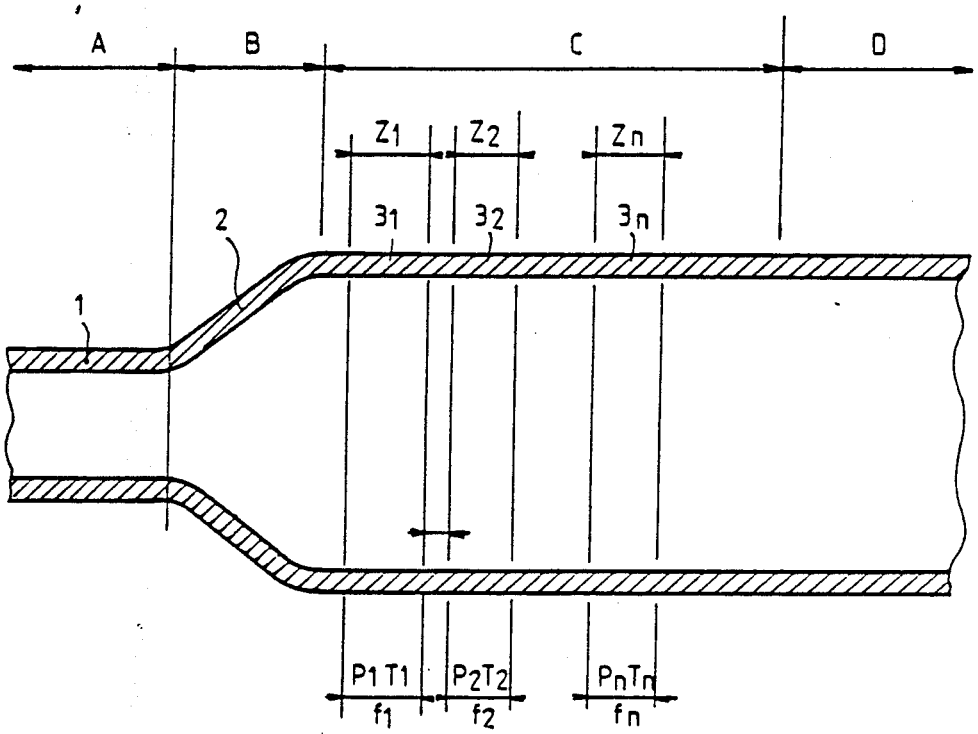
FIG. 1A diagrammatically shows the process according to the invention, applied to the manufacture of a product in the shape of a tube.

According to FIG. 1A, the process according to the invention, applied to the manufacture of a product in the shape of a tube (or of a web) consists of extruding (A) a tube 1, thereafter, where appropriate, increasing (B) its diameter 2, and then passing (C) this tube 3 through successive treatment zones (Zn) in which there are caused to prevail conditions of pressure (Pn), temperature (Tn) and frequency (fn) set up in accordance with a predetermined program in order to carry out a continuous rheological treatment on the product.

On leaving (D) the process, the product 3 obtained is then left in the shape of a tube or is cut longitudinally to shape a web; in either case, the product is wound up or is cut into segments.

Figure 1B:
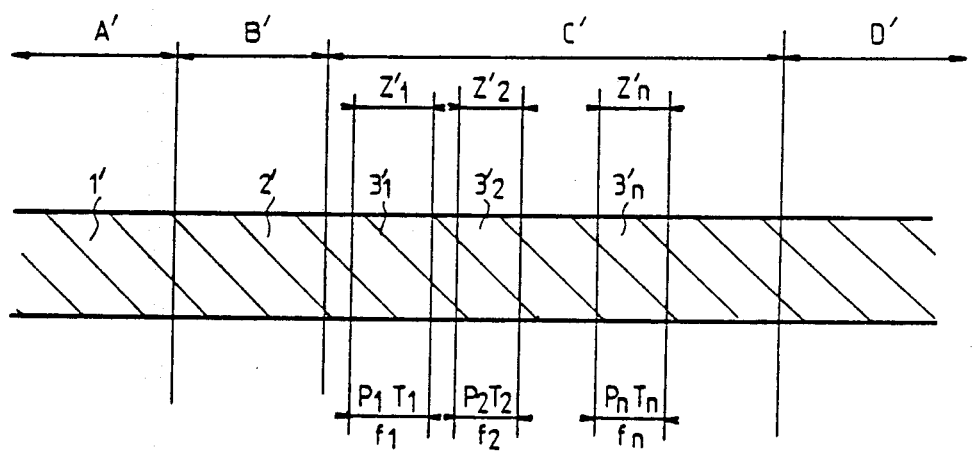
FIG. 1B diagrammatically shows the process according to the invention applied to the manufacture of a product in the shape of a rod, FIG. 2A diagrammatically shows an installation for carrying out the process of FIG. 1A, FIG. 2B diagrammatically shows an installation for carrying out the process of FIG. 1B, FIGS. 3 and 4 are two diagrams, in cross-section and in axial section, of an example of an installation according to the diagram showing the principle of the process, in FIG. 2A.

FIG. 1B diagrammatically shows the application of the process of the invention to the manufacture of a product in the shape of a rod which, in the simplest case, is of circular section.

Analogously to the process described above, a product 1' is extruded (A') in the shape of a rod (a solid product), the cross-section 2' of which is optionally modified (B'), after which the product 3' is passed (C') through treatment zones (Zn) in which prevail conditions of pressure, temperature and frequency (Pn, Tn, fn) which are predetermined in accordance with a treatment program which permits applying a continuous rheological treatment to the product.

At the outlet (D'), the product 3' is cut to the desired length or is wound up.

FIG. 2A diagrammatically shows an installation for carrying out the process according to FIG. 1A.

This installation is composed of an extruder 10 shown diagrammatically.

Where appropriate, this extruder directly feeds the downstream part of the installation consisting of a succession of stages as will be described below.

In certain cases, the extruder 10 is followed by a widening device 11 which increases the diameter of the extruded tube more than the natural increase in the diameter of the tube on leaving the extruder.

This thus gives a tube 3 of larger diameter, optionally of a diameter corresponding to the final diameter. This widening device 11 is of value in certain cases in order to impart an initial orientation to the extruder product, before the rheological treatment has been carried out.

Thereafter, the installation comprises a succession of stages $E_1 \ldots E_n \ldots$ corresponding to the zones $Z_n$ of the program of the rheological treatment process.

Each stage $E_n$ is composed of an external part $M_n$ and an internal part $N_n$ which cooperate.

The external part $M_n$ acts on the external surface of the length $3a$ of the product 3 and the internal part $N_n$ acts on the internal surface of the length $3n$.

According to an advantageous embodiment, the external part $M_n$ is a peripheral ring in which prevails the temperature $T_n$, so as to bring the ring of product (length referenced $3n$) to the temperature $T_n$. This external part $M_n$ has sufficient mechanical strength for the internal part $N_n$ to be able to induce in the length $3n$ of the product 3 the pressure $P_n$ and the frequency $f_n$ via the internal part $N_n$. It is to be emphasized that the temperature $T_n$ of the part $M_n$ and the pressure $P_n$ and the frequency $f_n$ induced by the part $N_n$ are defined independently of the corresponding parameters of the other stages $E_j$.

Though diagrammatically the structure of the installation of FIG. 2A is cylindrical (that is to say it maintains the same cross-section for the product), it is also possible to envisage increasing this cross-section in accordance with a predetermined profile, taking account of the parameters $P_n$, $T_n$ and $f_n$.

FIG. 2B shows an example of an installation for carrying out the process of FIG. 1B.

Analogously to the installation of FIG. 2A, this installation is composed of an extruder 104 which shapes a solid product 1' (in the shape of a rod).

Downstream of the extruder, the installation is composed of stages $E'_1 \ldots E'_n \ldots$ for applying the rheological treatment, that is to say the pressure $P_n$, temperature $T_n$ and frequency $f_n$, in accordance with the predetermined program, to the various zones $3'n$ of the product 3'. It should be emphasized that in this installation, again, the various stages $E'n$ are independent as regards the value of the parameters $P_n$, $T_n$ and $f_n$.

In this installation, the action of the parameters $P_n$, $T_n$ and $f_n$ is exerted solely via the external face of the product 3' ($3'n$).

In a particularly advantageous embodiment, the stages $E_n$, $E'n$ of the installations according to FIGS. 2A, 2B are rotary both to ensure better uniformity in applying the pressure $P_n$ and temperature $T_n$, and in order to exert the frequency $f_n$.

In the case of the installation of FIG. 2A, this rotary control can be provided from a central axle 12 which drives the various internal parts $N_n$ at defined speeds of rotation, the external parts $M_n$ being fixed in the simplest case, or also being rotary.

In the case of the installation of FIG. 2B, the rotary drive control is provided by an external axle 12' which transmits its movement to the rotary equipment of the stages $E'n$.

Figure 4:
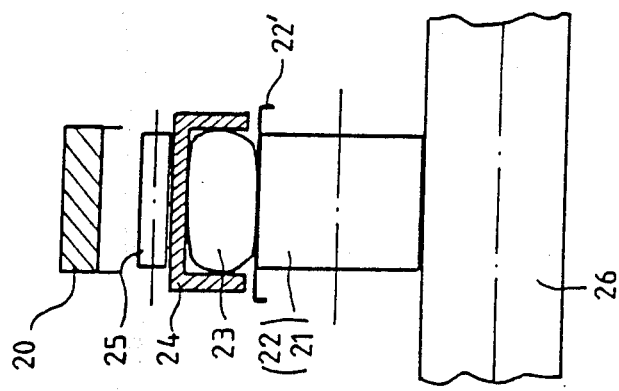
Figure 3:
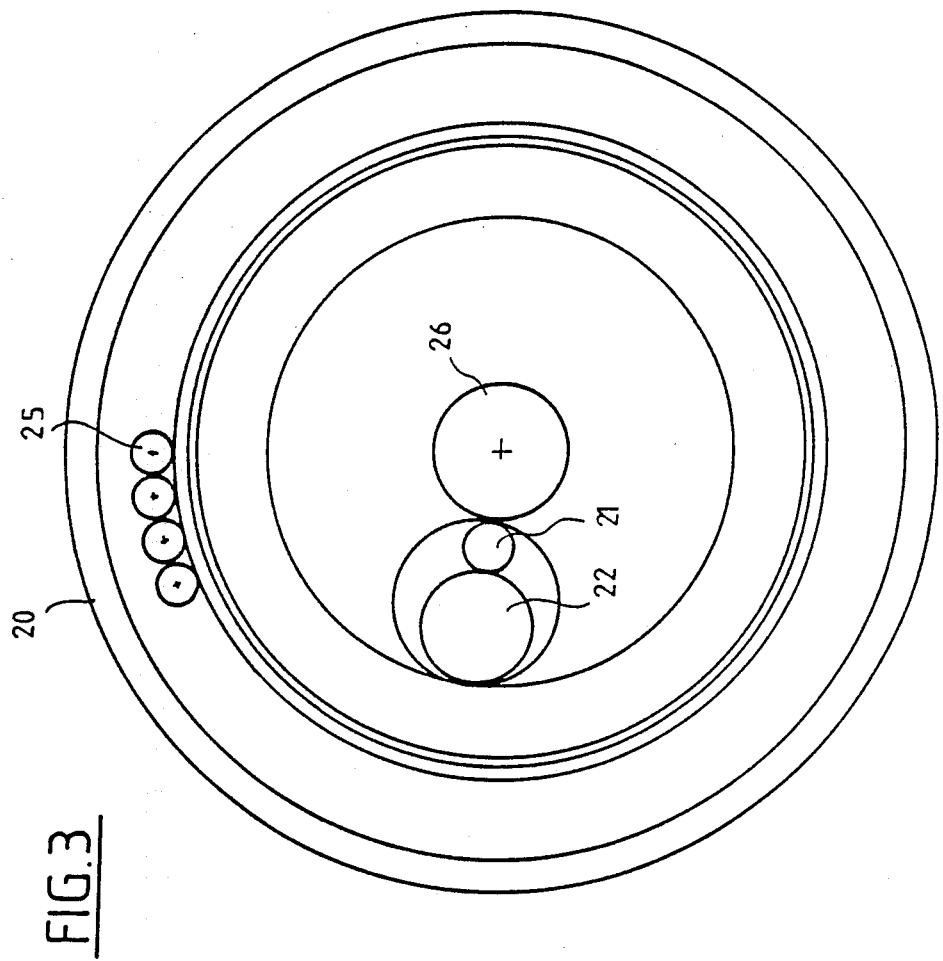

FIGS. 3 and 4 show an embodiment of a stage $E_n$ of the installation of FIG. 2A.

The external part $M_n$ consists of a fixed ring 20 formed by heating elements or elements employing the Peltier effect or by a chamber fed with a heat transfer fluid which regulates the temperature $T_n$ of this external part $M_n$.

The internal part $N_n$ is a rotary structure of the epicycloidal type formed by a set of gearwheels 21, 22 seated in an external ring 22', surrounded by a pressure chamber 23; this chamber is seated in a peripheral cage 24 which carries rollers 25 which transmit the pressure to the product (the product not being shown). The number of rollers 25, the speed of travel of these rollers 25 (the travel being brought about via the gearwheels 21, 22) and the speed of rotation of the central axle 26 are so chosen as to induce a predetermined frequency $f_n$ in the product.

It is to be noted that the rollers 25 in contact with the product and becoming heated due to the effect of rolling can be cooled (or even heated) depending on the temperature $T_n$ at which the product must be in this stage $E_n$.

The pressure $P_n$ under which the rollers 25 are applied against the product is defined by the pressure prevailing in the chamber 23; this chamber can consist of a toroidal ring into which a fluid at the desired pressure is injected.

At the end of the treatment described above, the stabilization of the product, and its protection against ageing, are carried out. For this purpose, the product is subjected to radiation of the ultraviolet, gamma or X-ray type.

Figure 5:
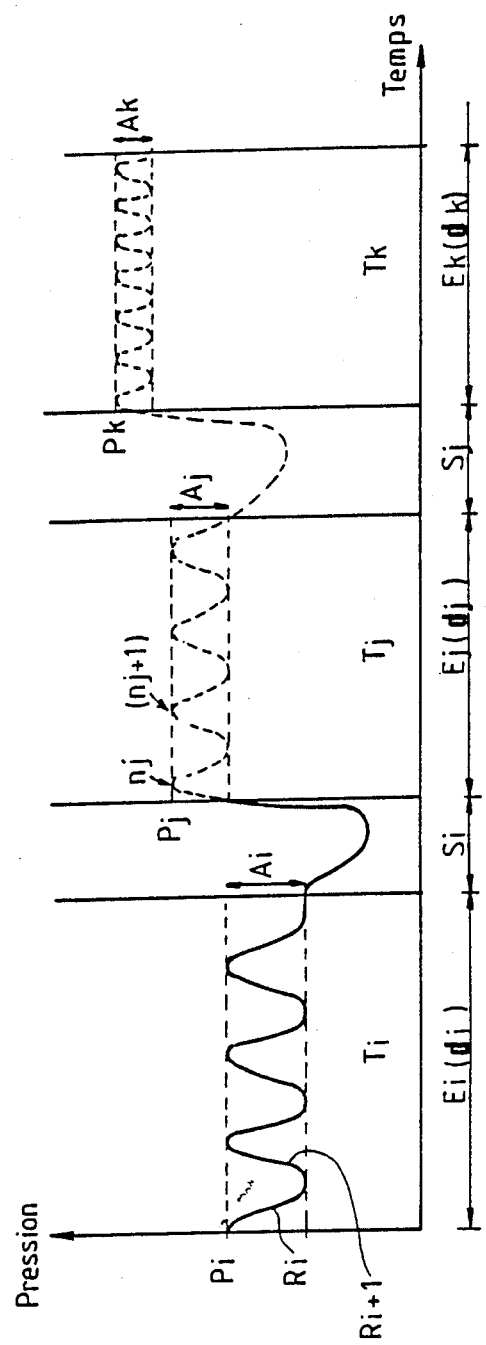
FIG. 5 is a graph showing the variations in pressure as a function of time.

FIG. 5 is a diagram which shows the variations in pressure acting on a section of product as it passes through the installation.

The graph shows the pressure P as a function of time. In fact, as the installation runs continuously, the time can also be represented by the distance travelled by a particular length of the product.

In FIG. 5, the pressures are represented as ordinates and the times or distances as abscissas.

A length of product first of all passes through stage $E_i$, of path length $d_i$. In this stage there prevails temperature $T_i$ and the product is subjected to the action of rollers which cause rises in pressure up to pressure $P_i$. After the action of a roller and before the action of the next roller which rolls over the product, the product relaxes in part $R_i$ of the curve, and the pressure then increases again in part $R_{i+1}$, then drops again and so on.

The variation in pressure between the maximum and the minimum corresponds to an amplitude $A_i$.

After this stage $E_i$, that is to say when the last roller 25 has passed over the length of product, and before the first roller of the next stage acts on this same length of product (which travels through the installation), there is an interval $S_i$ of variable length (which can be zero), during which the product relaxes. Thereafter, on entering the next stage $E_j$ ($j=i+1$), the pressure again rises to the pressure $P_j$ exerted by the rollers. Within this stage $E_j$, the succession of rollers treating the length of product creates a rise and drop in pressure of amplitude $A_j$ and of frequency corresponding to the speed of rotation multiplied by the number of rollers.

The width $d_j$ of this stage $E_j$ can be the same or different from the width $d_i$ of the preceding stage.

Following this stage $E_j$, there is again an interval $S_j$ of chosen width before the length of product reaches the next stage $E_k$.

The diagram in FIG. 5 also shows, by way of reminder, the temperatures $T_i$, $T_j$ and $T_k$ prevailing in the stages. The relation between these temperatures depends on the preset program.

It is important to mention that the vibration exerted by carrying out the extrusion process using the installation occurs in both directions of the product. It is thus a bidirectional vibration and the vibration does not have the same characteristics in both directions.

It should further be noted that the amplitudes Ai, Aj ... etc. ... of the variation in pressure in each stage depend on the parameters Tn, Pn and fn.

In general terms, the present invention relates to an installation intended to treat a product in the shape of a tube or rod, and more generally, by geometrical extension (namely by having a cylinder of infinite radius) a product in the shape of a film or a panel.

Though the treatment will be described below as being applied to a product which is very long or is continuous, the installation also permits the treatment of discontinuous products such as panels or segments of a tube or rod.

Finally, by suitably controlling the installation or the modules of which it is composed, it is possible to carry out the treatment of products whose longitudinal section is not constant, for example the treatment of a tube the shape of which locally exhibits swellings or recesses.

According to the invention, the product must pass through treatment zones in which there prevail conditions of pressure, temperature and frequency set up in accordance with a predetermined program for carrying out a rheological treatment.

Each length of product thus passes through the various treatment zones. For this purpose, the installation is composed of a set of successive stages which are not shown, the product passing through each stage.

Figure 6:
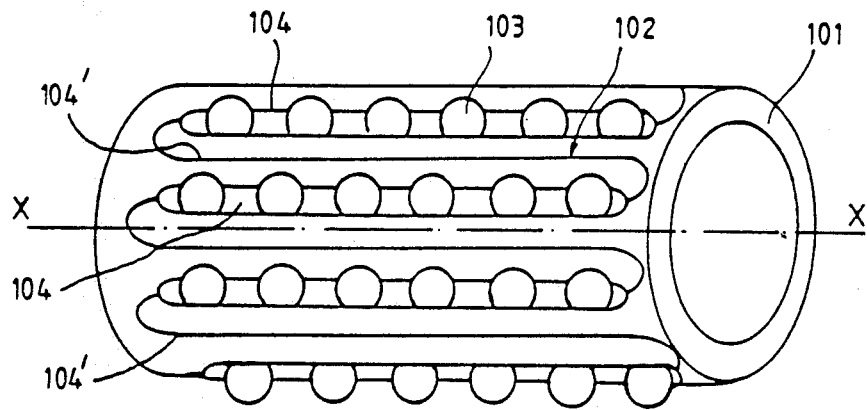
FIG. 6 is a diagrammatic view of a sleeve of a treatment installation according to the invention.

According to an embodiment, each stage comprises a sleeve such as that shown in FIG. 6. This sleeve can either rest against the external surface of the product or against the internal surface or against both surfaces simultaneously.

Figure 7:
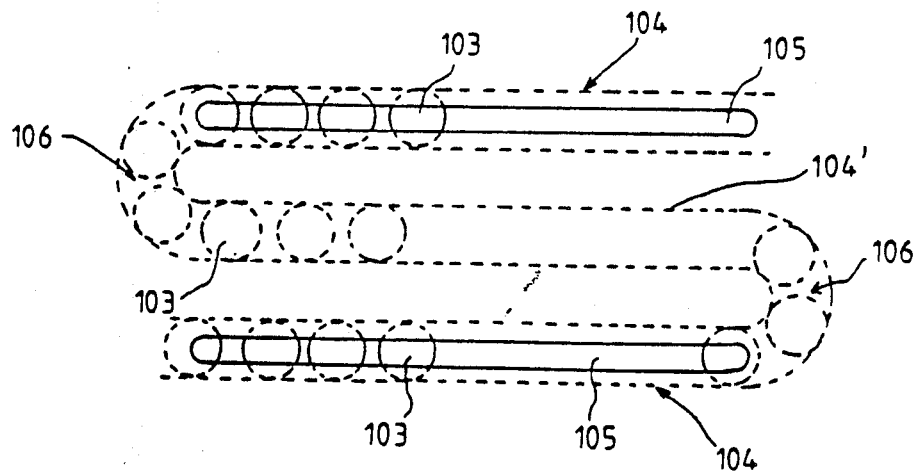
FIG. 7 is a detail developed view of a part of the sleeve of FIG. 6, showing the track for the balls.

According to FIGS. 6 and 7, the sleeve, shown by way of example and having the appearance of a maize cob, is composed of a support structure 101 in which is formed a meandering track 102 in which the rolling devices 103, in the shape of balls, travel.

The track 102 has been shown as a single line in some of its parts and by a double line, representing an orifice, in other parts.

This meandering track 102 is composed of segments 104, 104' which are preferably longitudinal, that is to say parallel to the axis X—X of the sleeve; at least some 104 of the segments 104, 104' are provided with an orifice 105 through which the balls 103 project. On the other hand the segments 104' are closed and do not allow the balls to show on the outside; the segments 104 and 104' are connected by return portions 106.

At the orifices 105, the balls 103 show partially while over the other parts of the track the balls are hidden because the track is recessed.

According to the preferred embodiment shown, one out of two segments is open. Under these conditions, if the balls are not driven, they roll over the surface of the product to be treated without slipping on this surface. At the same time as the balls roll, they move forward on the track. As one segment out of two is not opened, the balls which travel and revolve in the opposite direction to the direction of travel of the product do not come into contact with the product and neither cause braking of the product nor blockage of the travel of the set of balls in the track.

Though, according to the embodiment shown here, the track is formed of longitudinal segments, the track can have a different shape depending on the treatment conditions to be achieved. It can, for example, be a spiral track relative to the sleeve. This spiral track can extend over the entire surface of the sleeve in the manner of a through thread of very small pitch and with a single turn. It is also possible to have spiral segments spread over the surface in accordance with a large pitch, the junction between the spiral segments being effected as in the case of the longitudinal rectilinear segments, namely by return zones 106.

Figure 8:
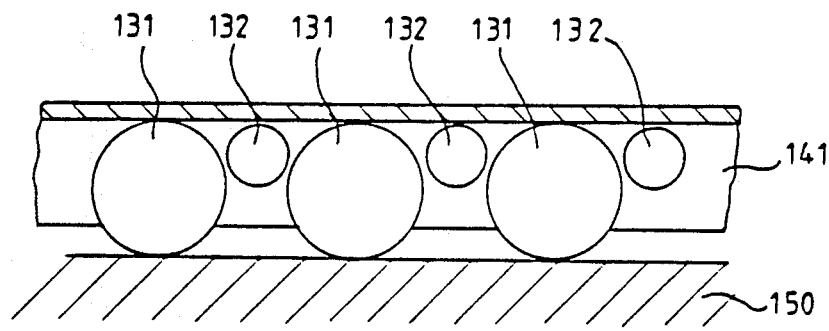
FIG. 8 is a diagram of part of a track, in accordance with a particular embodiment of the invention.

The sectional view in FIG. 8 shows very diagrammatically the arrangement of rolling devices in the shape of balls 131 in the channel 141 of a sleeve which is not shown in its entirety. The rolling devices 131 are separated by auxiliary rolling devices 132 forming separator devices so that the rolling devices 131 should not roll against one another and become braked.

This figure also shows the face of the product 150 on which the balls 131, namely the active balls, roll.

It should be noted that the active balls 131 are of large diameter and the spacer balls 132 are of small diameter; however this diameter is sufficiently large for the latter balls to be unable, where relevant, to get out through the orifice of the track.

Figure 9:
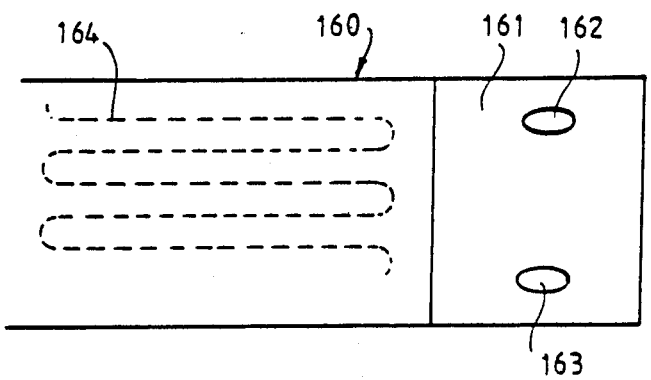
FIG. 9 is a view of the end of a sleeve equipped with a box for injecting fluid for the propulsion of the rolling devices.

According to FIG. 9, the sleeve 160, which is only shown diagrammatically, comprises a fluid distribution box 161 equipped with a feed orifice 162 and a discharge orifice 163. It is thus possible to inject fluid (liquid or air) into the track of the balls 164, shown diagrammatically as a dotted line, but without showing the balls, so that the fluid drives the balls and causes them to travel in a forced manner in the track, with the balls rolling over the surface of the product to be treated.

Figure 10:
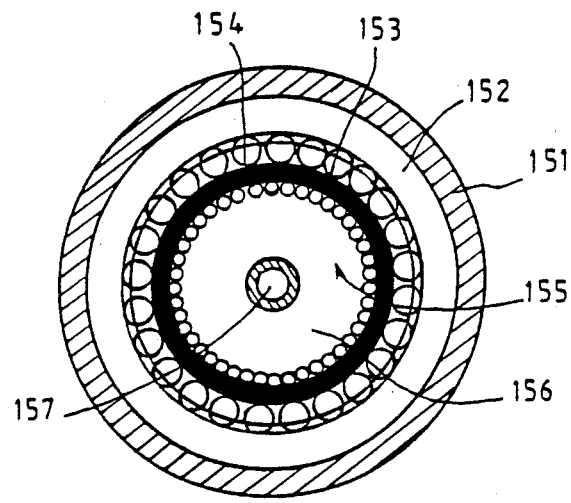
FIG. 10 is a diagrammatic sectional view of a treatment stage equipped with an external sleeve and an internal sleeve according to the invention and FIG. 11 is a perspective view of a module of an installation according to the invention.

FIG. 10 shows a device according to the invention with an external part comprising a cage 151, a pressure chamber 152, and a sleeve in which the balls 153 travel and rest against the external face of the tubular product 154 which is to be treated. Inside the product there is also provided a sleeve of analogous type to that described above. This sleeve 155 rests against the internal surface of the tube 154 via the balls. The sleeve 155 is rotationally driven by means 156 which are not shown, and the assembly is mounted on an axle 157.

Figure 11:
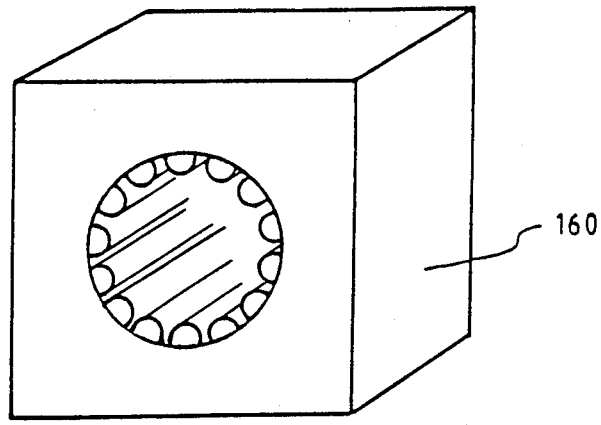

Finally, FIG. 11 shows a modular element 160 according to the invention. This modular element equipped with means of introducing a fluid for heating or for driving the balls, as well as means for rotationally driving the various cycloidal and hypocycloidal balls and elements can be manufactured as a standard item.

I claim:

1. A method of rheological treatment of a cylindrical product, comprising the steps of:
    moving the cylindrical product longitudinally through a sequence of zones;
    in each zone, applying to the cylindrical product a combination of a preselected temperature, pressure against at least one surface of the cylindrical product, and vibrational frequency; and
    applying the combinations of the temperature, the pressure, and the vibrational frequency applied to the cylindrical product in each of the sequence of zones according to a predetermined program.

2. Apparatus for rheological treatment of a cylindrical product, comprising:
    a plurality of independently controllable stages, each stage adapted for accepting the cylindrical product to pass therethrough;
    in each stage, means for applying to the cylindrical product a preselected temperature, pressure, and vibrational frequency; and means for moving the cylindrical product longitudinally through the stages in series,
wherein the preselected conditions of the temperature, the pressure, and the vibrational frequency in each of the plurality of zones correspond to a predetermined program.

3. Apparatus for rheological treatment of a cylindrical product in a form of a hollow tube having an interior surface and an exterior surface, comprising:
a plurality of independently-controllable stages, each stage adapted for accepting the cylindrical product to pass therethrough;
in each stage, means for applying to the cylindrical product a preselected temperature, pressure against at least one surface of the cylindrical product and vibrational frequency;
in at least one stage, a fixed ring forming a central opening having an interior surface through which the cylindrical product passes within the stage, the interior surface of the opening constituting a guide surface and adapted to contact the exterior surface of the cylindrical product; and
in at least one stage, an internal rotary means adapted to be disposed in the interior of the cylindrical product, the rotary means having at least one roller adapted to roll against the interior surface of the cylindrical product to apply a preselected pressure at a preselected vibrational frequency against the interior surface,
wherein the preselected temperature, pressure and the vibrational frequency in each stage corresponds to a predetermined program.

4. Apparatus as in claim 3, wherein the internal rotary means further comprises an arrangement of epicycloidal gear wheels operatively connected to the roller, and an axle adapted to drive the gear wheels, the axle being common to at least one other stage.

5. Apparatus as in claim 2, wherein at least one stage comprises:
a plurality of internal rollers adapted to surround the cylindrical product as it passes through the stage and adapted to exert pressure against the surface of the cylindrical product,
an external drive axle adapted to rotate the rollers around the surface of the cylindrical product, and
means for varying the speed of rotation of the rollers such that the number of internal rollers and the speed of rotation of the rollers at the surface of the cylindrical product corresponds to a vibrational frequency applied to the product.

6. Apparatus as in claim 5, further comprising a sleeve having an internal surfacer and at least one track forming an orifice on the internal surface and wherein the rollers are movable within the tracks and are arranged so as to partially project through the orifice to contact the surface of the product to be treated.

7. Apparatus for rheological treatment of a cylindrical product, comprising:
a plurality of independently controllable stages adapted to accept the cylindrical product therethrough,
in each stage, means for applying to the cylindrical product a preselected temperature, pressure and vibrational frequency, wherein the preselected conditions of the temperature, the pressure, and the vibrational frequency in each of the plurality of zones correspond to a predetermined program,
means for moving the cylindrical product longitudinally through the plurality of stages in series, and
at least one stage in the series having a peripheral pressure chamber adapted to exert pressure on the surface of the cylindrical product as it passes through the stage, the peripheral pressure chamber having
(1) a sleeve adapted to surround the cylindrical product as it moves through the stage, the sleeve having an internal surface and a plurality of tracks defined therein, the plurality of tracks having a meandering shape, each track forming an orifice on the internal surface of the sleeve,
(2) a plurality of rolling devices movable within the tracks and arranged so as to partially project through the orifice so as to contact the surface of a cylindrical product as it moves through the stage,
(3) a drive axle for rotating the sleeve around the cylindrical product, thereby causing the rolling devices projecting through the orifice in the tracks to exert pressure against the surface of the cylindrical product, and
(b 4) means for controlling the speed of rotation of the sleeve around the cylindrical product,
wherein the number of rollers exposed to the cylindrical product and the speed of rotation of the rollers at the surface of the length of cylindrical product to be treated correspond to a vibrational frequency applied to the cylindrical product.

8. Apparatus as in claim 7, wherein the orifices of the tracks are disposed longitudinally relative to an axis of the sleeve.

9. Apparatus as in claim 7 wherein the tracks are arranged so that all of the rollers in contact with the cylindrical product move in one direction on the surface of the cylindrical product.

10. Apparatus for rheological treatment of a cylindrical product, comprising:
a plurality of independently controllable stages each adapted to accept the cylindrical product therethrough,
in each stage, means for applying to the cylindrical product a preselected temperature, pressure, and vibrational frequency, wherein the preselected temperature, pressure, and vibrational frequency conditions in each of the plurality of stages correspond to a predetermined program,
means for moving the cylindrical product longitudinally through the plurality of stages in series,
at least one stage in the series having a peripheral pressure chamber adapted to exert pressure on the surface of the cylindrical product as it passes through the stage, the peripheral pressure chamber having
(1) a sleeve adapted to surround the cylindrical product as it moves through the stage, the sleeve having an internal surface and a plurality of tracks defined therein, each track forming an orifice on the internal surface of the sleeve,
(2) a plurality of spherical rolling devices movable within the tracks and arranged so as to partially project through the orifice in the track so as to contact the surface of the cylindrical product as it passes through the stage,
(3) a drive axle for rotating the sleeve around the cylindrical product, whereby the rolling devices projecting through the orifice in the tracks exert pressure against the surface of the cylindrical product, (4) means for controlling the speed of rotation of the sleeve around the cylindrical product, wherein the number of rollers exposed to the cylindrical product and the speed of rotation of the rollers along the surface of cylindrical product correspond to a preselected vibrational frequency applied to the product.

11. Apparatus as in claim 10, further comprising means for propelling the rollers through the tracks of the sleeve.

12. Apparatus as in claim 10, further comprising:

propulsion means for circulating a quantity of propulsion fluid and for causing the rollers to travel within the tracks of the sleeve, and box means forming a cavity in communication with the tracks in the sleeve and adapted to retain the quantity of propulsion fluid.

13. Apparatus as in claim 10, further comprising spacer balls having a relatively smaller diameter than the rollers, the spacer balls disposed between the rollers within the track.

14. Apparatus as in claim 10, wherein each stage in the series includes at least one sleeve.

15. Apparatus as in claim 10, wherein the sleeve has an adjustable inner diameter to conform to cylindrical products of various diameters.

* * * * *